No. 772,755. PATENTED OCT. 18, 1904.
A. H. SWAN, E. G. SKILLINGS & F. J. FINNEGAN.
PEEL BLADE TIP.
APPLICATION FILED MAR. 24, 1904.
NO MODEL.
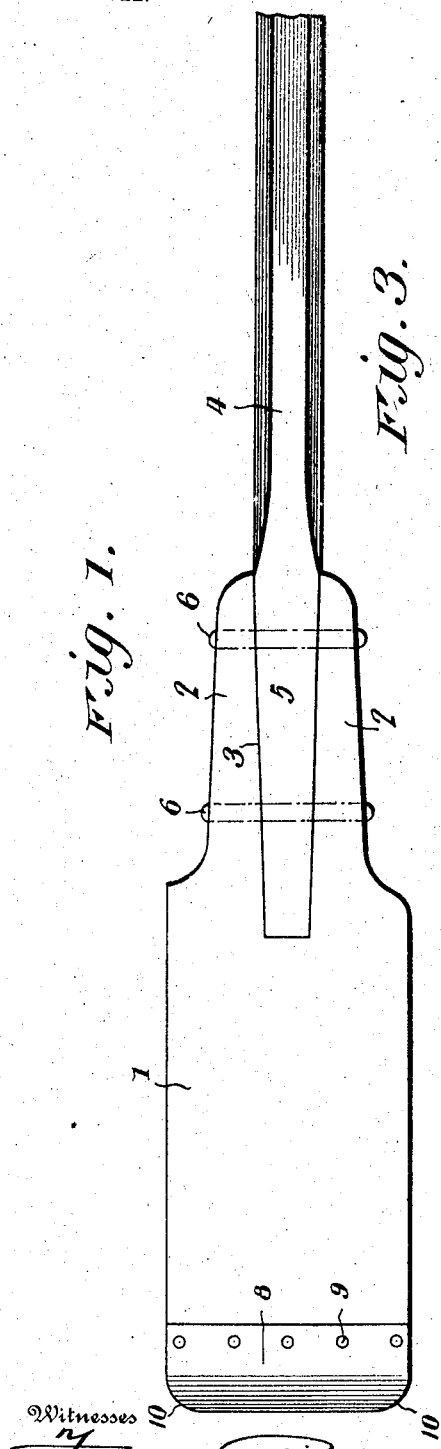
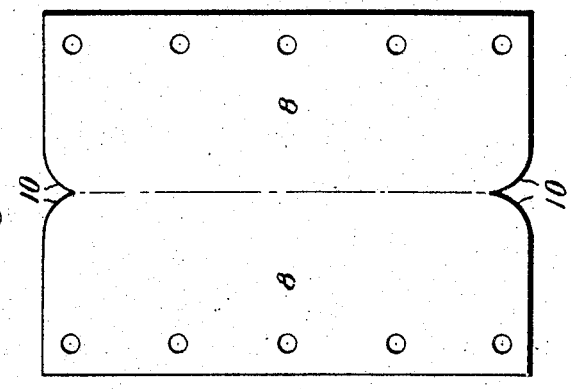
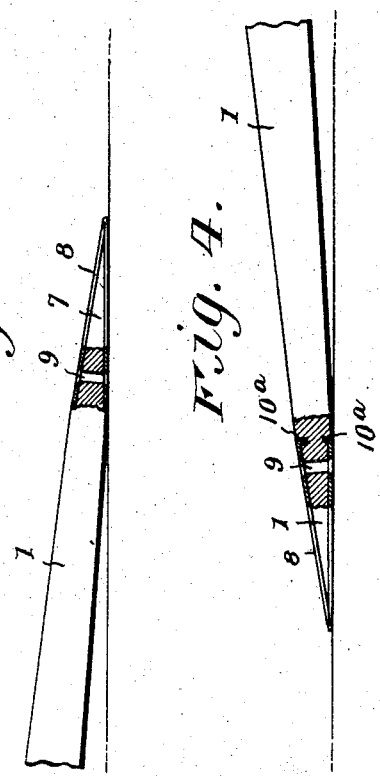
Witnesses
Inventors
Arthur H. Swan,
Edmund G. Skillings
Francis J. Finnegan.
By Victor J. Evans
Attorney No. 772,755. Patented October 18, 1904.

UNITED STATES PATENT OFFICE.

ARTHUR H. SWAN, EDMUND G. SKILLINGS, AND FRANCIS JAMES FINNEGAN, OF WEST EVERETT, MASSACHUSETTS.

PEEL-BLADE TIP.

SPECIFICATION forming part of Letters Patent No. 772,755, dated October 18, 1904.

Application filed March 24, 1904. Serial No. 199,882. (No model.)

*To all whom it may concern:*

Be it known that we, ARTHUR H. SWAN, EDMUND G. SKILLINGS, and FRANCIS JAMES FINNEGAN, citizens of the United States, residing at West Everett, in the State of Massachusetts, have invented new and useful Improvements in Peel-Blade Tips, of which the following is a specification.

This invention relates to a baker's peel wherein the forward edge or point is reinforced by a particular form of metal casing or tip to protect it from wear and breakage and also to provide a sharp blade. The improved peel also has an advantageous handle-attaching construction.

The primary object of the invention is to provide a peel with a blade having a sharp forward end to facilitate handling bread, pies, cakes, or the like baked in tins or pans or otherwise disposed in an oven, the sharp end of the blade being provided with a metallic edge or guard, which will materially assist in disposing the blade under the bread, pie, or cake pans and the removal of the latter from an oven without overturning the tins or pans, said metallic edge or guard also preventing wear on the reduced edge of the blade. It will be understood that the peel may be used for other purposes or in handling other articles to be baked, and modifications therein as to proportions and dimensions may be adopted at will to adapt it for various uses.

In the drawings, Figure 1 is a top plan view of a peel embodying the features of the invention and showing the handle partially broken away. Fig. 2 is an edge elevation of a portion of the peel-blade partially broken away. Fig. 3 is a plan view of the blank forming the metal tip or guard for the blade. Fig. 4 is an edge elevation of a portion of the peel-blade, partially broken away and showing a slight modification.

Similar numerals of reference are employed to indicate corresponding parts in the several views.

The numeral 1 designates a peel-blade which is constructed of wood and has a reduced shank 2 for the attachment of a handle. The shank 2 has a longitudinal slot 3 extending centrally therethrough and into a portion of the blade, said slot having its said walls converging toward the front terminal wall thereof. A handle 4 is attached to the shank 2 and has a reduced extremity 5 shaped to snugly fit in the slot 3, the opposite side edges of the extremity 5 gradually converging toward the front end of said extremity in angles corresponding to the sides of the slot 3, and the upper and lower faces of the extremity 5 are flat and are flush with the upper and lower surfaces of the shank of the blade when the handle is applied to the latter. In fitting the extremity 5 into the slot 3 it is pushed vertically into the latter, and in view of the form of the slot and said extremity withdrawal of the handle from the shank 2 of the blade will be resisted. As an efficient auxiliary in securing the handle to the shank 2 pins 6 are inserted transversely through the shank and extremity 5, as clearly shown by Fig. 1.

Over the forward reduced end 7 of the blade 1 a metallic sheathing or guard 8 is applied and secured by rivets or analogous fastenings 9, which are countersunk at their opposite terminals in the sheathing, as clearly shown by Fig. 2. The sheathing or guard 8 may be of any suitable metal, and the blank from which it is constructed is illustrated by Fig. 3 and consists, essentially, of a rectangular piece of metal having the side edges at diametrical points formed with recesses 10, having convex walls to compensate for the curved corners of the forward reduced extremity 7 of the blade. The blank shown by Fig. 3 is bent at the center, as indicated by the dotted line, and the opposite portions of the sheathing or guard when applied are slightly countersunk in the opposite sides of the blade to avoid the formation of projections or shoulders at the reduced end of the blade.

In the modification shown by Fig. 4 the inner terminals of the sheath or guard 8 in rear of the rivets or other fastenings 9 are turned inwardly, as at 10$^a$, and driven into the blade. The advantage of this modified construction is a greater resistance to loosening of the sheath or guard.

The improved device will be found exceptionally useful for the purpose for which it has been devised and from a structural standpoint has many advantages other than those enumerated. It is also economical in use in view of its durability.

Having thus described the invention, what is claimed as new is—

A baker's peel comprising a blade having a detachable handle secured thereto, the blade being provided with a reduced forward end having rounded corners, a guard consisting of a rectangular piece of metal having central curved recesses formed diametrically on opposite side edges thereof, said guard being bent over at the recessed portions to conform to the configuration of the reduced end of the blade, and said recesses conforming to the configuration of the rounded corners of said blade, and means for securing said guard to said reduced end of the blade, substantially as specified.

In testimony whereof we affix our signatures in presence of two witnesses.

ARTHUR H. SWAN.
  EDMUND G. SKILLINGS.
  FRANCIS JAMES FINNEGAN.

Witnesses:
  FREDRIK PETERSON,
  ELLIE S. SWAN.